United States Patent
Berdugo et al.

(10) Patent No.: US 11,403,614 B2
(45) Date of Patent: Aug. 2, 2022

(54) SYSTEM AND METHODS FOR PERFORMING A DISABILITY-ASSISTED TRANSACTION

(71) Applicant: Mastercard International Incorporated, Purchase, NY (US)

(72) Inventors: Andrea Catalina Berdugo, Maryland Heights, MO (US); Christopher T. Scholl, Saint Peter's, MO (US)

(73) Assignee: Mastercard International Incorporated, Purchase, NY (US)

( * ) Notice: Subject to any disclaimer, the term of this patent is extended or adjusted under 35 U.S.C. 154(b) by 65 days.

(21) Appl. No.: 16/662,326

(22) Filed: Oct. 24, 2019

(65) Prior Publication Data

US 2021/0125169 A1    Apr. 29, 2021

(51) Int. Cl.

| | |
|---|---|
| G06Q 20/32 | (2012.01) |
| G07G 1/00 | (2006.01) |
| G06Q 20/20 | (2012.01) |
| G06Q 20/36 | (2012.01) |
| G06Q 20/40 | (2012.01) |
| G09B 21/00 | (2006.01) |
| H04W 4/021 | (2018.01) |
| G06Q 20/12 | (2012.01) |
| G06Q 20/34 | (2012.01) |

(52) U.S. Cl.
CPC ......... *G06Q 20/3224* (2013.01); *G06Q 20/20* (2013.01); *G06Q 20/3278* (2013.01); *G06Q 20/401* (2013.01); *G09B 21/006* (2013.01); *G09B 21/008* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 8,606,333 B2 * | 12/2013 | Frerking ........... | H04M 1/72478 455/575.2 |
| 10,962,942 B2 * | 3/2021 | Richardson ......... | H04L 12/2821 |
| 2011/0112768 A1 * | 5/2011 | Doyle ................. | G09B 29/007 342/450 |
| 2011/0184824 A1 * | 7/2011 | George ............... | G06Q 20/209 705/25 |
| 2013/0106592 A1 * | 5/2013 | Morgan ................ | G08G 1/205 340/426.19 |
| 2014/0162692 A1 * | 6/2014 | Li ........................... | H04L 67/40 455/456.3 |
| 2016/0148182 A1 * | 5/2016 | Craine ............... | G06Q 20/4015 705/16 |
| 2017/0241660 A1 * | 8/2017 | Sekar ................... | H04W 4/021 |
| 2018/0249289 A1 * | 8/2018 | Chatterjee .......... | G06Q 30/0639 |
| 2019/0156326 A1 * | 5/2019 | Todasco ............ | G06Q 20/3278 |
| 2020/0379621 A1 * | 12/2020 | Sartori ................... | G06F 3/0488 |
| 2020/0393266 A1 * | 12/2020 | Ahmed ................. | G09B 21/008 |

* cited by examiner

*Primary Examiner* — Christopher Bridges
*Assistant Examiner* — Tony P Kanaan
(74) *Attorney, Agent, or Firm* — Hovey Williams LLP (57) ABSTRACT

Methods and systems for facilitating transactions by disabled cardholders are provided herein. In particular, a method is provided for performing a transaction using a disability-friendly geolocation payment system that includes a payment application with a disability functionality, which may be activated so as to provide auditory instructions and/or enlarged text instructions to a disabled cardholder.

20 Claims, 5 Drawing Sheets

SYSTEM AND METHODS FOR PERFORMING A DISABILITY-ASSISTED TRANSACTION

FIELD OF THE DISCLOSURE

The field of the disclosure relates generally to payment systems and methods for transactions involving disabled cardholders. More particularly, the field of the disclosure generally relates to systems and methods for providing assistance to a disabled cardholder, using a digital wallet.

BACKGROUND

People with disabilities, such as those having hearing or visual disabilities, generally have difficulties carrying out commercial transactions and working with existing payment applications in today's retail settings. Typically, these transactions are not designed to facilitate the physical needs of disabled individuals. Consequently, people with disabilities may struggle at Point-of-Sale (POS) devices and in general retail settings because they can't adequately communicate or interact with POS devices, thereby resulting in an unpleasant shopping experience.

Despite the advancements made to assist disabled individuals, further advancements are needed in regard to payment systems and applications for disabled individuals.

BRIEF DESCRIPTION

This summary is not intended to identify essential features of the present invention and is not intended to be used to limit the scope of the claims. These and other aspects of the present invention are described below in greater detail.

In one or more embodiments, a computer-implemented method performing a disability-assisted transaction is provided. Generally, the method comprises the steps of: (a) starting a payment application on a mobile electronic device of a cardholder, wherein the payment application comprises a disability functionality; (b) activating the disability functionality on the payment application; (c) automatically determining, via one or more processors and based at least in part on a geolocation of the mobile electronic device, that the mobile electronic device has entered a designated merchant space; (d) automatically linking the payment application with a merchant computing device within the designated merchant space via a wireless communication protocol; and (e) transmitting one or more disability-based communications to the merchant computing device.

In one or more embodiments, a disability-assisted system is provided. Generally, the disability-assisted system comprises: (a) a memory device for storing data; and (b) a processor communicatively coupled to the memory device. The processor is programmed to: (i) start a payment application on a mobile electronic device of a cardholder, wherein the payment application comprises a disability functionality; (ii) activate the disability functionality on the payment application; (iii) automatically determine, based at least in part on a geolocation of the mobile electronic device, that the mobile electronic device has entered a designated merchant space; (iv) automatically link the payment application with a merchant computing device within the designated merchant space via a wireless communication protocol; and (v) transmit one or more disability-based communications to the merchant computing device.

In one or more embodiments, a non-transitory computer-readable storage media having computer-executable instructions for facilitating disability-assisted transaction system is provided. When executed by at least one processor, the computer-executable instructions cause the processor to: (a) start a payment application on a mobile electronic device of a cardholder, wherein the payment application comprises a disability functionality; (b) activate the disability functionality on the payment application; (c) automatically determine, based at least in part on a geolocation of the mobile electronic device, that the mobile electronic device has entered a designated merchant space; (d) automatically link the payment application with a merchant computing device within the designated merchant space via a wireless communication protocol; and (e) transmit one or more disability-based communications to the merchant computing device.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

The figures depict exemplary embodiments for purposes of illustration only. The figures are not intended to limit the present invention to the specific embodiments they depict. One skilled in the art will readily recognize from the following discussion that alternative embodiments of the systems and methods illustrated herein may be employed without departing from the principles of the invention described herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled. It is contemplated that the disclosure has general application to providing digital data streams to disability-friendly devices in industrial, commercial, and residential applications.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

The present invention generally relates to systems and methods for providing assistance to a disabled cardholder, using a digital wallet application on a cardholder's device. As described further below, the digital wallet application may contain a disability functionality that can be enabled by the disabled cardholder. This disability functionality allows the disabled cardholder to indicate their disabilities (e.g., hearing-impaired and/or visually-impaired) and enable a geolocation function that: (i) informs the disabled cardholder whenever they enter a retail setting with an interactive merchant device and (ii) interacts with the merchant device so as to facilitate the particular needs of the disabled cardholder.

Disabled cardholders generally experience many difficulties when carrying out commercial transactions with most POS devices in today's retail settings. Typically, most POS devices are not designed to facilitate the needs of disabled individuals. Furthermore, existing payment applications also lack the technical components required to meet the needs of a disabled cardholder. However, the system and methods of the present invention are able to overcome these shortcomings.

The present invention generally relates to systems and methods for providing assistance to a disabled cardholder, using a digital wallet application on a cardholder's device. As described further below, the digital wallet application on the cardholder's device may contain a disability functionality that can be enabled by the disabled cardholder. This disability functionality allows the disabled cardholder to indicate their disabilities (e.g., hearing-impaired and/or visually-impaired) and enable a geolocation function/system that: (i) informs the disabled cardholder whenever they enter a retail setting with an interactive merchant device and (ii) interacts with the merchant device so as to facilitate the particular needs of the disabled cardholder.

Figure 1:
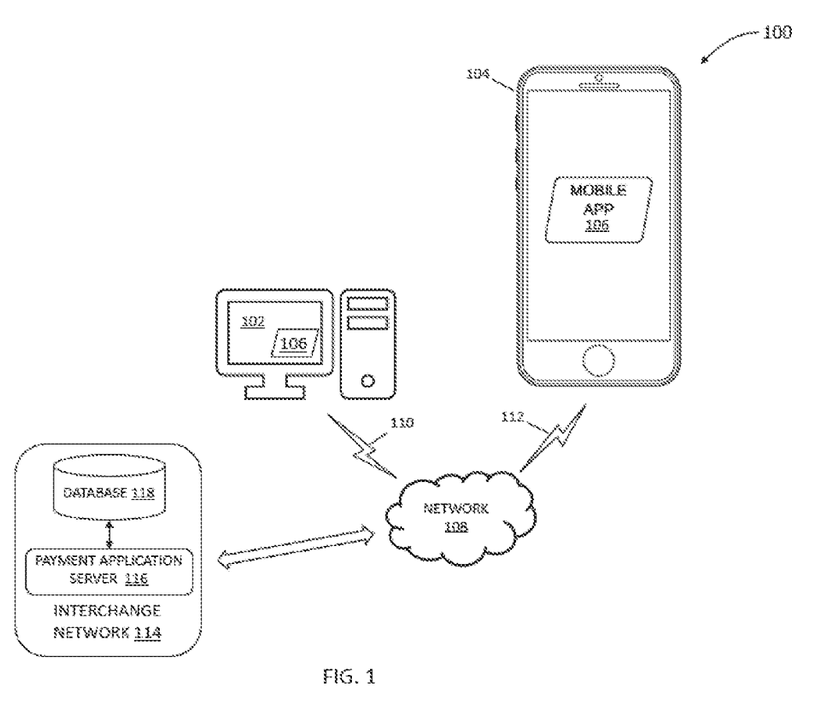
FIG. 1 is a simplified block diagram of an exemplary disability-friendly payment system in accordance with one embodiment of the present disclosure.

FIG. 1 is a simplified block diagram of an exemplary disability-friendly payment system 100 in accordance with one embodiment of the present disclosure. The disability-friendly payment system 100 may be utilized by cardholders (not shown in FIG. 1) as part of a process of performing an electronic transaction facilitated by transmission of a selected digital stream to one or more of a cardholder computer system 102 and/or a cardholder mobile computing device 104, which the cardholder may use to transmit instructions from a digital wallet system or payment application 106 on which is stored payment account information and a disability functionality (e.g., a Masterpass® brand system; Masterpass is a registered trademark of Mastercard International Incorporated).

As illustrated in FIG. 1, the cardholder computer system 102 and/or the cardholder mobile computing device 104 are configured to communicate with a communications network 108 via a wireless signal 110 and a wireless signal 112, respectively. The communications network 108 includes, for example and without limitation, one or more of a local area network (LAN), a wide area network (WAN) (e.g., the Internet, etc.), a mobile network, a virtual network, and/or any other suitable public and/or private network capable of facilitating a wireless communication link with the cardholder computer system 102 and/or the cardholder mobile computing device 104. In some embodiments, the communications network 108 may include more than one type of network, such as a private payment transaction network provided by an interchange network 114 to merchant acquirers (not shown in FIG. 1) and payment card issuers (not shown in FIG. 1) and, separately, the public Internet, which may facilitate communication between a merchant (not shown in FIG. 1) and one or more of the cardholder computer systems 102 and/or cardholder mobile computing devices 104.

In the exemplary embodiment, the cardholder computer systems 102 and the cardholder mobile computing devices 104 may be any device capable of interconnecting to the Internet including mobile computing devices, such as a laptop or desktop computer, a web-based phone (e.g., a "smart phone"), a personal digital assistant (PDA), a tablet or phablet, a web-connectable appliance, a "smart watch" or other wearable device, or other web-connectable equipment. It should be understood that the disability-friendly payment system 100 may include any number of cardholder computer systems 102 and cardholder mobile computing devices 104.

The disability-friendly payment system 100 also includes a payment application server 116. The payment application server 116 includes at least one processor (not shown in FIG. 1) in communication with a database 118. The database 118 contains information on a variety of matters, including, for example, one or more cardholder profiles, payment account data for a cardholder's payment accounts, and other information described herein. In one embodiment, the database 118 is stored on the payment application server 116. In an alternative embodiment, the database 118 is stored remotely from the payment application server 116 and may be non-centralized. In the example embodiment, the payment application server 116 is integral to and/or associated with the payment or interchange network 114, which is described further herein.

In the example embodiment, the payment application server 116 receives payment card data for the cardholder's one or more payment cards from the cardholder via the cardholder computer systems 102 and the cardholder mobile computing devices 104. The payment card data is stored by the payment application server 116 in the database 118.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

Figure 2:
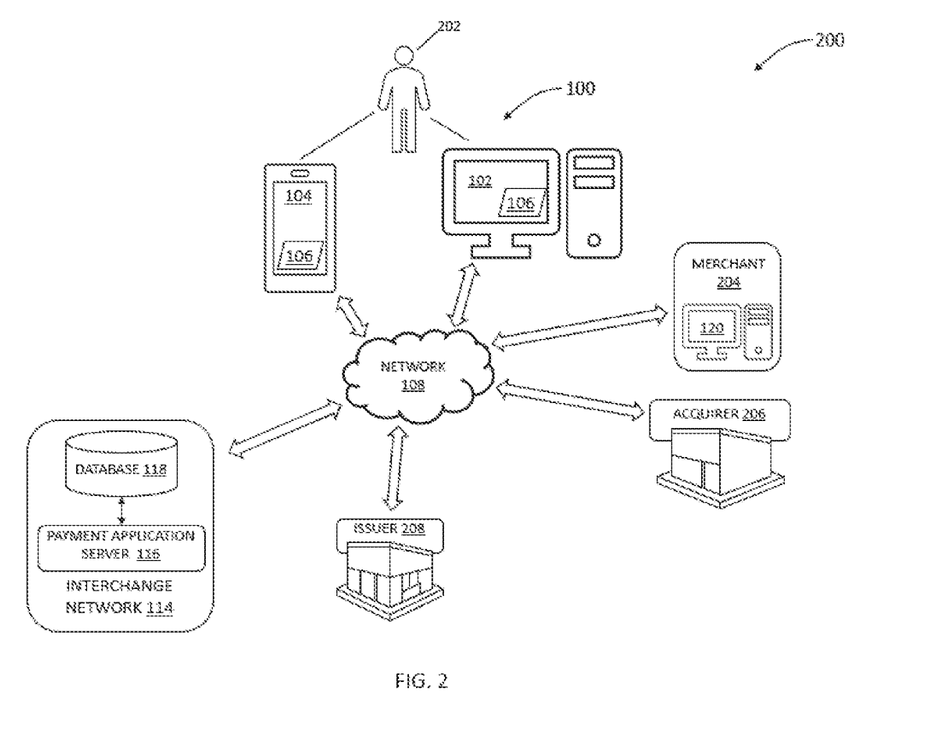
FIG. 2 is a simplified block diagram of an exemplary payment card network system including the disability-friendly payment system of FIG. 1.

FIG. 2 is a simplified block diagram of an exemplary payment card network system 200 including the disability-friendly payment system 100 in accordance with one embodiment of the present disclosure. The payment card network system 200 may be utilized by consumers and merchants as part of a process of initiating an authorization request and performing a transaction concurrent with delivery of goods or services as described herein via the interchange network 114. In addition, the payment card network system 200 is a transaction card account system including the cardholder mobile computing device 104 and the cardholder computer system 102, which the cardholder 202 may use either to conduct electronic transactions and/or record payments for electronic transactions related to purchase of a merchant's goods or services. It should be understood that the various components shown in FIG. 2 may be a subset of a larger system.

The payment card network system 200 enables payment-by-card transactions in which merchants 204, acquirers 206, and/or card issuers 208 do not need to have a one-to-one relationship. Although parts of the payment card network system 200 are presented in one arrangement, other embodiments may include the same or different parts arranged otherwise, depending, for example, on authorization processes for purchase transactions, communication between computing devices, etc.

In the example embodiment, the payment card network system 200 generally includes the cardholder mobile computing device 104, the cardholder computer system 102, merchants 204, acquirers 206, issuers 208, and the interchange network 114 coupled in communication via the communications network 108.

In a typical transaction card system, a financial institution called the "issuer" issues a transaction card, such as a credit card, to a consumer such as the cardholder 202, who uses the transaction card to tender payment for a purchase from the merchant 204. The cardholder 202 may input information from a transaction card into the cardholder mobile computing device 104 and/or cardholder computer system 102 and store the information as digital wallet data 306 (broadly, payment credentials) (shown in FIG. 3). The merchant 204 is typically associated with products, for example, and without limitation, goods and/or services, that are offered for sale and are sold to the cardholder 202. The merchant 204 includes, for example, a physical location and/or a virtual location such as an Internet-based store-front.

To accept payment from the cardholder 202, for example, with the digital wallet data 306, the merchant 204 must normally establish an account with a financial institution that is part of the payment card network system 200. This financial institution is usually called the "merchant bank," the "acquiring bank," or the acquirer 206. When the cardholder 202 submits payment for a purchase with the cardholder mobile computing device 104 and/or the cardholder computer system 102 using the digital wallet data 306, the merchant 204 requests authorization from the acquirer 206 for the purchase. The request may be performed over a telephone but is usually performed using a point-of-sale terminal that reads the cardholder's account information from a magnetic stripe, a chip, embossed characters on the transaction card, or digital wallet data and communicates electronically with the transaction processing computers of the acquirer 206. Alternatively, the acquirer 206 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 114, computers of the acquirer 206 or merchant processor will communicate with computers of the issuer 208 to determine whether the cardholder's account is in good standing and whether the purchase is covered by the cardholder's available credit line. Based on these determinations, the request for authorization will be declined or accepted. If the request is accepted, an authorization code is issued to the merchant 204.

When a request for authorization is accepted, the available credit line of the cardholder's account is decreased. Normally, a charge for a payment card transaction is not posted immediately to the cardholder's account because bankcard associations, such as Mastercard International Incorporated, have promulgated rules that do not allow the merchant 204 to charge, or "capture," a transaction until the purchased goods are shipped or the purchased services are delivered. However, with respect to at least some debit card transactions, a charge may be posted at the time of the transaction. When the merchant 204 delivers the purchased products, the merchant 204 captures the transaction, for example, by appropriate data entry procedures on a point-of-sale terminal. This may include bundling of approved transactions daily for standard retail purchases. If the cardholder 202 cancels a transaction before it is captured, a "void" is generated. If the cardholder 202 returns goods after the transaction has been captured, a "credit" is generated. The interchange network 114 and/or the issuer 208 stores the transaction card information, such as, and without limitation, a type of merchant, a merchant identifier, a location where the transaction was completed, an amount of purchase, and a date and time of the transaction, in the database 118.

After a purchase has been made, a clearing process occurs to transfer additional transaction data related to the purchase among the parties to the transaction, such as the acquirer 206, the issuer 208, and the interchange network 114. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 208, the cardholder's account is decreased. Normally, a charge is posted immediately to the cardholder's account. The interchange network 114 transmits the approval to the acquirer 206 for distribution of goods/services or information, or cash in the case of an automated teller machine (ATM).

After a transaction is authorized and cleared, the transaction is settled among the merchant 204, the acquirer 206, and the issuer 208. Settlement refers to the transfer of financial data or funds among the merchant's account, the acquirer 206, and the issuer 208 related to the transaction. Usually, transactions are captured and accumulated into a "batch," which is settled as a group. More specifically, a transaction is typically settled between the issuer 208 and the interchange network 114, and then between the interchange network 114 and the acquirer 206, and then between the acquirer 206 and the merchant 204. It should be appreciated that more or less information related to transactions, as part of either authorization, clearing, and/or settling, may be included in the transaction data and stored within the database 118, at the merchant 204, the acquirer 206, the payment network 112, and/or the issuer 208. Further, transaction data, unrelated to a particular payment account, may be collected by a variety of techniques, and similarly stored within the database 118.

In some embodiments, cardholders 202 involved in the transactions described herein may be prompted to agree to legal terms associated with their payment accounts, for example, during enrollment in such payment accounts, etc. As such, the cardholder 202 may voluntarily agree to allow the merchants 204, the issuers 208, the interchange network 114, etc., to utilize data collected during enrollment and/or collected relating to processing the transactions, subsequently for one or more of the purposes described herein.

As shown in FIG. 2, the interchange network 114 includes the payment application server 116, which is, for example, and without limitation, a server, a network of multiple computing devices, a virtual computing device, or the like. In addition, in some embodiments, the payment card network system 200 may also include one or more merchant or client sub-systems 120 (also referred to as client systems) coupled in communication to the payment application server 116. The client systems 120 are computers including, for example, a web browser and a memory device, such that the payment application server 116 is accessible to the client systems 120 using, for example, the Internet. The client systems 120 are interconnected to the Internet through one or more interfaces including a network, such as a local area network (LAN) or a wide area network (WAN), dial-in-connections, cable modems, and special high-speed ISDN lines. The client systems 120 can be any device capable of interconnecting to the Internet including, for example, a web-based smartphone, a personal digital assistant (PDA), or any other web-based connectable equipment.

As described above, the payment card network system 200 includes one or more cardholder computer systems 102 that are connected to the payment application server 116, and in some embodiments, may be connected to the client systems 120. The cardholder computer systems 102 are interconnected to the Internet through one or more interfaces including a network, such as a local area network (LAN) or a wide area network (WAN), dial-in-connections, cable modems, wireless modems, and special high-speed ISDN lines. The cardholder computer systems 102 can be any computing device capable of interconnecting to the Internet and including an input device capable of reading or storing information from a user's financial transaction card, including the digital wallet data 306.

Furthermore, as described above, the payment card network system 200 includes at least one cardholder mobile computing device 104 (e.g., a smartphone or other computing device used by the consumer to complete transactions), which is configured to communicate with the payment application server 116. In one embodiment, the cardholder mobile computing device 104 is associated with or controlled by a consumer making a purchase using a transaction card account and the payment card network system 200. In the example embodiment, the cardholder mobile computing device 104 is configured to communicate with the payment application server 116 to transmit, for example, and without limitation, the cardholder's account access credentials and/or transaction data to the payment application server 116. The cardholder mobile computing device 104 is configured to communicate with the payment application server 116 using various outputs including, for example, radio frequency communication, near field communication (NFC), network-based communication, and the like.

The payment application server 116 is connected to the database 118. In one embodiment, the database 118 is stored on the payment application server 116 and can be accessed by users at one of the client systems 120 by logging onto the payment application server 116 through one of the client systems 120. The database 118 may store transaction data generated as part of sales activities conducted over the bankcard network including data relating to merchants, account holders or customers, and purchases. The database 118 may also store account data including at least one of a user name, a user address, an account number, and other account identifiers. The database 118 may also store merchant data including a merchant identifier that identifies each merchant registered to use the payment account card network, and instructions for settling transactions including merchant bank account information. The database 118 may also store primary account numbers (PANs) or bank account numbers for various parties including merchants and customers, along with payment verification identifiers and other data necessary to implement the system and processes described herein.

Figure 3:
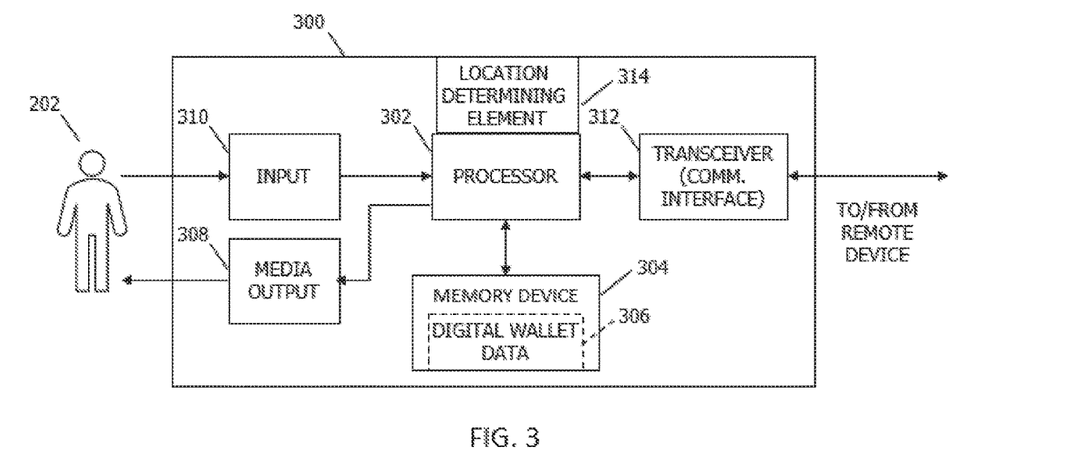
FIG. 3 is a block diagram illustrating an example of a user computing system, such as a cardholder mobile computing device shown in FIG. 1.

FIG. 3 is an example configuration of a user system 300 operated by a user, such as the cardholder 202 (shown in FIG. 2). In some embodiments, the user system 300 is the cardholder computer system 102 (shown in FIG. 1), the cardholder mobile computing device 104 (shown in FIG. 1), and/or a client system 120 (shown in FIG. 2).

In the example embodiment, the user system 300 includes one or more processors 302 for executing instructions. In some embodiments, executable instructions are stored in a memory device 304. The processor 302 may include one or more processing units arranged, for example, in a multi-core configuration. The memory device 304 is any device allowing information such as the digital wallet data 306, executable instructions, and/or written works to be stored and retrieved. The memory device 304 includes one or more computer readable media.

In one example embodiment, the processor 302 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

A location of the user system 300 can be obtained through conventional methods, such as a location service (e.g., global positioning system (GPS) service) in the user system 300, "ping" data that includes geotemporal data, from cell location register information held by a telecommunications provider to which the user system 300 is connected, and the like. For example, in various embodiments, a location determining element 314 can be part of or separate from the processor 302 to enable the location of the user system 300 to be determined.

In various embodiments, the location determining element 314 generally determines a current geolocation of the corresponding electronic device and may receive and process radio frequency (RF) signals from a global navigation satellite system (GNSS) such as the global positioning system (GPS) primarily used in the United States, the GLONASS system primarily used in regions formerly part of the Soviet Union, or the Galileo system primarily used in Europe. The location determining element 314 may accompany or include an antenna to assist in receiving satellite signals. The antenna may be a patch antenna, a linear antenna, or any other type of antenna that may be used with location or navigation devices. Furthermore, the location determining element 314 may include satellite navigation receivers, processors, controllers, other computing devices, or combinations thereof, and memory. The location determining element 314 may process a signal, referred to herein as a "location signal," from one or more satellites that includes data from which geographic information, such as the current geolocation, is derived. The current geolocation may include coordinates, such as the latitude and longitude, of the current location of the corresponding electronic device. Consequently, the location determining element 314 may respectively communicate the current geolocation of the user system 300 to the corresponding processor 302 and/or memory device 304.

Although embodiments of the location determining element 314 may include a satellite navigation receiver, it will be appreciated that other location-determining technology may be used. For example, cellular towers or any customized transmitting radio frequency towers may be used instead of satellites to determine the location of the corresponding user system 300 by receiving data from at least three transmitting locations and then performing basic triangulation calculations to determine the relative position of the device with respect to the transmitting locations. With such a configuration, any standard geometric triangulation algorithm may be used to determine the location of the user system 300. Each location determining element 314 may also include or be coupled with a pedometer, accelerometer, compass, or other dead-reckoning components which allow it to determine the location of the corresponding user system 300. Furthermore, in certain embodiments, the location determining element 314 may determine the current geographic location through a communications network, such as by using Assisted GPS (A-GPS), or from another electronic device. The location determining element 314 may even receive location data directly from a user and/or profile owner.

Each user system 300 may be assigned or configured, typically by its manufacturer, with a universally unique identifier (UUID), a 128-bit value. Each user system 300 may be programmed or configured with an association to a corresponding MPIL. For instance, a user system 300 UUID (or other unique identifier) may be associated with a corresponding MPIL profile (see discussion below). The user system 300 may periodically and/or continuously transmit geolocation data (e.g., latitude and longitude coordinates) for the MPIL for storage in the corresponding MPIL profile.

The user system 300 also includes at least one media output component 308 for presenting information to the cardholder 202. The media output component 308 is any component capable of conveying information to the cardholder 202. In some embodiments, the media output component 308 includes an output adapter such as a video adapter and/or an audio adapter. The output adapter is operatively coupled to the processor 302 and operatively connectable to an output device such as a display device, a liquid crystal display (LCD), organic light emitting diode (OLED) display, or "electronic ink" display, and/or an audio output device, such as an integrated speaker and the like.

In one example embodiment, the media output component 308 includes an integrated display, which can include, for example, and without limitation, a liquid crystal display (LCD), an organic light emitting diode (OLED) display, or an "electronic ink" display. In some embodiments, the integrated display may optionally include a touch controller for support of touch capability. In such embodiments, a cardholder mobile computing device 104 may detect a person's presence by detecting that the person has touched the integrated display on the cardholder mobile computing device 104.

In some embodiments, the user system 300 includes an input device 310 for receiving input from the cardholder 202. The input device 310 may include, for example, a touch sensitive panel, a touch pad, a touch screen, a stylus, a gyroscope, an accelerometer, a position detector, a keyboard, a pointing device, a mouse, and/or an audio input device (e.g., a microphone). A single component such as a touch screen may function as both an output device of the media output component 308 and the input device 310, as described above. The user system 300 may also include a transceiver 312 (broadly, a communication interface), which is communicatively connectable to the network 108 (shown in FIG. 1) and/or a remote device such as the merchant client system 120 (shown in FIG. 2). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the cardholder 202 via the media output component 308 and, optionally, receiving and processing input from the input device 310. A user interface may include, among other possibilities, a web browser and/or the payment application 106 (shown in FIG. 1). Web browsers enable users, such as the cardholder 202, to display and interact with media and other information typically embedded on a web page or a website from payment application server 116. The payment application 106 allows the cardholder 202 to interact with the payment application server 116 to perform electronic transactions.

Figure 4:
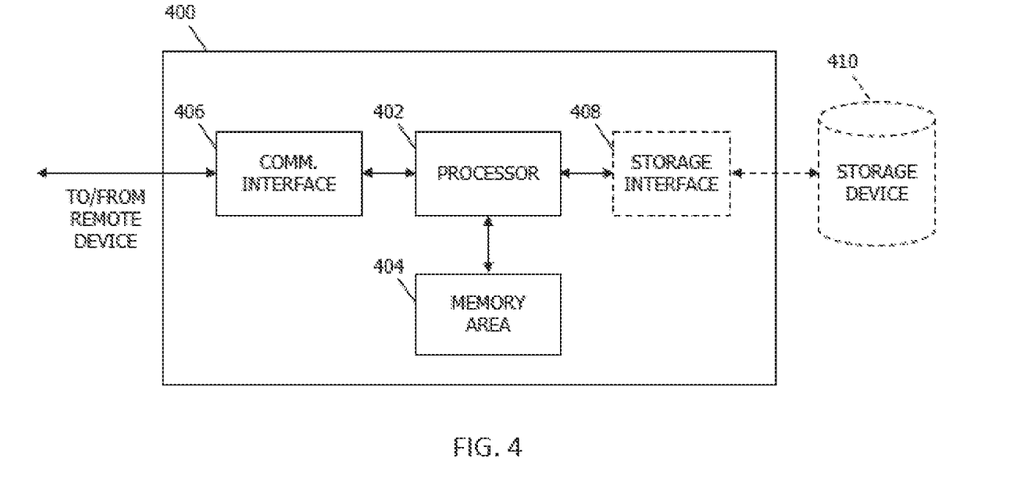
FIG. 4 is an example configuration of a server system, such as a payment application server shown in FIG. 1.

FIG. 4 is an example configuration of a server system 400, such as the payment application server 116 (shown in FIG. 1). In some embodiments, the server system 400 is substantially like the payment application server 116. In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows °, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 402 is operatively coupled to a communication interface 406 such that the server system 400 can communicate with a remote device such as a user system 300 or another server system 400. For example, the communication interface 406 may receive communications from the cardholder mobile computing device 104 and/or the cardholder computer system 102 via the Internet, as illustrated in FIG. 1.

The processor 402 is operatively coupled to the storage device 410. The storage device 410 is any computer-operated hardware suitable for storing and/or retrieving data. In some embodiments, the storage device 410 is integrated in the server system 400 and is like the database 118 (shown in FIG. 1). In other embodiments, the storage device 410 is external to the server system 400. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Figure 5:
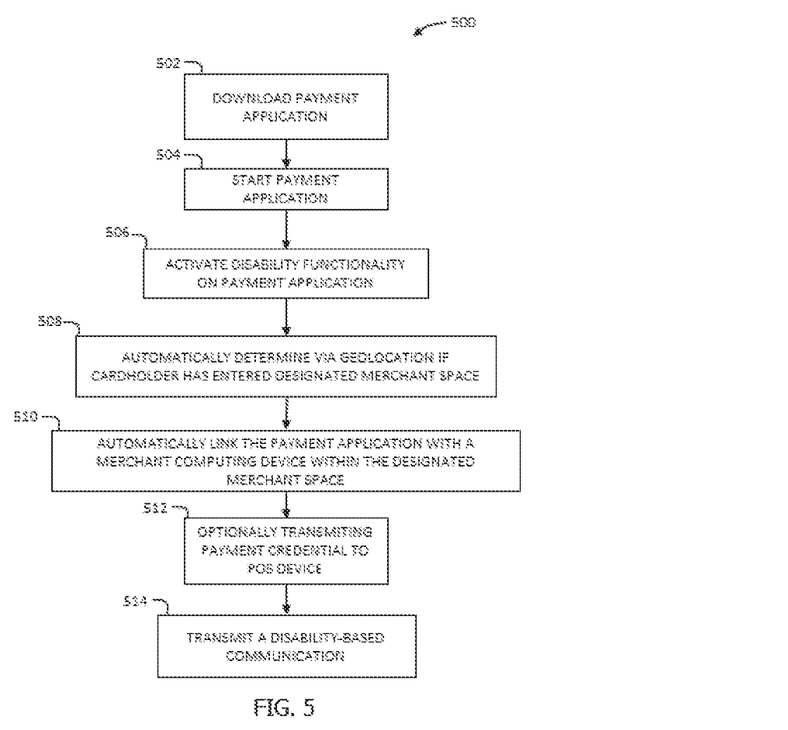
FIG. 5 is a flowchart illustrating an exemplary computer-implemented method for carrying out a disability-friendly transaction in accordance with one embodiment of the present disclosure.

FIG. 5 is a flowchart illustrating an exemplary computer-implemented method 500 for transmitting digital signals to and from a disability-friendly system in order to perform a transaction in accordance with one embodiment of the present disclosure. The operations described herein may be performed in the order shown in FIG. 5 or, unless stated otherwise or as may be approved to those ordinary skilled in the art, may be performed in a different order. Furthermore, according to certain aspects of the present invention, some operations may be performed concurrently as opposed to sequentially. In addition, some operations may be optional.

The computer-implemented method 500 is described below, for ease of reference, as being executed by exemplary devices and components introduced with the embodiments illustrated in FIGS. 1-4. In one embodiment, the method 500 may be implemented by the cardholder computer system 102 and/or the cardholder mobile computing device 104 (each shown in FIG. 1). In the exemplary embodiment, the method 500 relates to the transmission of instructions for performing a disability-friendly transaction using the payment application 106 from the cardholder computer system 102 and/or the cardholder mobile computing device 104. While operations within the method 500 are described below regarding the cardholder computer system 102 and/or the cardholder mobile computing device 104, the method 500 may be implemented using the cardholder computer system 102 and/or the cardholder mobile computing device 104 as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 502, the cardholder 202 (shown in FIG. 2) downloads the payment application 106 comprising a disability functionality (shown in FIG. 1). For example, the cardholder 202 may connect to a payment application server, such as the payment application server 116 (shown in FIG. 1) that is part of the interchange network 114 described above, which may instruct the cardholder 202 to download the payment application 106 to the cardholder computer system 102 and/or the cardholder mobile computing device 104. Alternatively, the cardholder 202 may download the payment application 106 from a mobile application web store that is compatible with the cardholder computer system 102 and/or the cardholder mobile computing device 104. When the cardholder 202 uses the payment application 106, a direct link is established via a wireless connection, for example, via a Wi-Fi connection to the payment application server 116 via the communications network 108 (shown in FIG. 1).

The cardholder computer system 102 and/or the cardholder mobile computing device 104, such as a web-based smartphone, is configured to execute the payment application 106 with the disability functionality. In some embodiments, the payment application 106 may be stored in a cloud-based interface, which may include cloud storage capability as well as any cloud-based API that facilitates communication between the payment application server 116 and the cardholder computer system 102 and/or the cardholder mobile computing device 104. The payment application 106 with disability functionality facilitates transmitting and receiving payment card data between the cardholder mobile computing device 104 and the payment application server 116 for performing payment transactions.

At operation 504, the cardholder 202 executes or starts the payment application 106 on the cardholder computer system 102 and/or the cardholder mobile computing device 104.

At operation 506, after the payment application 106 is started, the cardholder may choose to enable the disability functionality of the payment application 106. For example, the payment application 106 may include a settings or options menu that has an option for enabling/disabling the disability functionality of the payment application 106. When the disability functionality is enabled in the settings or options menu, the payment application 106 automatically carries out one or more of the actions described below. When the disability functionality is disabled in the settings or options menu, the payment application 106 does not carry out any of the disability-friendly functionalities described herein.

In various embodiments, the payment application 106 may include a disability functionality icon that may be triggered (e.g., pressed, swiped, voice-activated, etc.) to start, stop, and/or pause the disability functionality in real-time. For example, if the cardholder 202 determines that the ambient environment does not require the use of the disability functionality, the cardholder may choose to not enable the disability functionality for a particular transaction. In certain embodiments, the disability functionality of the payment application 106 may be voice-activated due to the visual impairments of the cardholder. Thus, in such embodiments, the cardholder may enable the disability-friendly functionalities of the payment application 106 based upon verbal instructions from the cardholder.

In certain embodiments, when the disability function of the payment application 106 is enabled, the payment application 106 is configured to determine a real or estimated geographic location of the disabled cardholder via the location determining element 314. Such location-tracking may be periodic and/or, preferably, substantially continuous. In an embodiment, geolocation(s) of the cardholder system 300 previously or currently and/or expected geolocation(s) in the future are determined by the location determining element 314. When the geolocation functionality is enabled by the cardholder, the payment application 106 may automatically link with a receptive merchant computing device, such as a merchant point-of-sale ("POS") device or a help kiosk located at the merchant space, when the cardholder enters the geofencing of a designated merchant space. When linked with the merchant computing device within the geofencing of a designated merchant space, the payment application 106 may allow the disabled cardholder to request specific assistance from the merchant 204 based on their disabilities and/or submit a specific shopping list of desired products (e.g., an itemized request list) to the merchant computing device. For example, once linked with the merchant computing device, the payment application 106 may allow the cardholder to request assistance from the merchant 204 for obtaining specific products from shelves, requesting assistance with coupons or other merchant offers, filling out a submitted shopping list, and/or delivering products to a cardholder's vehicle and/or cart. The payment application 106 may also submit a notification and location identification marker (via the location determining element 314) to the merchant computing device so that the sales clerk of the merchant 204 may easily find and assist the cardholder within the geofencing area of the merchant.

In certain embodiments, when the disability function of the payment application is enabled, the payment application 106 may be configured to play pre-recorded audible instructions and messages to facilitate easy and precise execution of a payment transaction. The pre-recorded audible instructions may be stored locally on the cardholder computer system 102 and/or the cardholder mobile computing device 104, for example, in the memory device 304 (shown in FIG. 3). Alternatively, the pre-recorded audible instructions may be stored in the database 118 (shown in FIG. 1) and transmitted to payment application 106 in real-time as required. The pre-recorded audible instructions may be stored as digital audio signals, which are transmitted to a disability-friendly device 102 via the wireless connections 112 and/or 114. For example, these pre-recorded audible instructions may include: (i) a notice that the payment application 106 has been activated, (ii) a notice that the disability functionality of the payment application 106 has been enabled or disabled, (iii) a notice that the payment application 106 has linked with a POS device, (iv) instructions to provide payment information to the POS device, and/or (v) instructions on how to complete a commercial transaction with the linked POS device.

In certain embodiments, when the disability function of the payment application is enabled, the payment application 106 may comprise a chatbot functionality that can facilitate chatbot-based communications between the payment application 106 and the merchant 204. The chatbot functionality allows the impaired cardholder to conduct a conversation with the merchant 204 via auditory or textual methods. More particularly, chatbot programs are designed to simulate intelligent conversation with one or more human users via auditory or textual methods. The chatbot functionality of the payment application 106 may provide a chat session via processor 402 between the impaired cardholder and the POS device, which allows real-time interactive dialog to occur between the cardholder and the POS device. Consequently, this can allow an impaired cardholder to effectively communicate with a sales clerk at the POS devices by using these chatbot-facilitated transmissions.

The chatbot functionality allows the cardholder to conduct a conversation with the POS device via auditory or textual methods (e.g., talk-to-text and/or text messages). More particularly, the chatbot functionality may stimulate a conversational experience or chat session between the hearing-impaired cardholder (via the payment application 106) and the POS device. In such embodiments, the cardholder can submit a request over the payment application 106 (via auditory or textual methods) and the chatbot will attempt to interpret the request and then provide a relevant answer. For example, if a hearing-impaired cardholder requests help from a sales clerk using the payment application 106, the chatbot may provide locations where such a sales clerk may be found. Generally, the answer provided by the chatbot may be a simple answer to a known question that may be relevant to the commercial transactions handled by POS device. If the answer to the cardholder's question is unknown, the chatbot may simply offer a list of Frequently Asked Questions (FAQ) and invite the cardholder to select one over the payment application 106.

Generally, chatbot programs are designed to simulate intelligent conversation between the human cardholder and the POS device via auditory or textual methods. The chatbot functionality of the payment application 106 may provide a chat session via processor 402 between the hearing-impaired cardholder 202 and the POS device, thereby allowing a real-time interactive dialog to occur between the cardholder 202 and the POS device. Consequently, this can allow a hearing-impaired cardholder 202 to effectively communicate with a POS device by using chatbot-facilitated transmissions, which are user-friendly to the disabled cardholder 202

In various embodiments, the payment application 106 may connect with the POS device, create a chat session with the POS device over the payment application server 116 via the chatbot functionality, and then facilitate interactive communications in real-time between the impaired cardholder and the POS device. During these interactive communications, the POS device may submit questions to the impaired cardholder, such as those regarding their shopping needs, and the cardholder may provide their answers using the payment application 106 via the input device 310.

In certain embodiments, the cardholder computer system 102, the cardholder mobile computing device 104, and/or the POS device may comprise a chatbot functionality, such as a data-driven and predictive chatbot functionality, that can facilitate an interactive dialog between the cardholder 202 and POS device. Furthermore, in certain embodiments, such chatbots can apply predictive intelligence and analytics to enable a personalized shopping experience between the cardholder and POS device. Chatbots may also be referred to as "virtual assistants" or "digital assistants."

Generally, in various embodiments, the chat session involving the chatbot functionality may involve: (1) the cardholder 202 submitting a request (e.g., questions or inquiries regarding commercial transactions) to the POS device via the payment application 106; (2) the POS device analyzing the cardholder's request; and (3) the POS device creating and submitting a list of answers and possible follow up questions in response to the cardholder's specific requests (e.g., request specific shop items or assistance), which will be displayed in the payment application 106 on the cardholder computer system 102 or the cardholder mobile computing device 104 The cardholder may submit this request to the POS device via text messages and/or a "talk-to-text" functionality enabled by the payment application 120.

In certain embodiments, when the disability functionality of the payment application is enabled 106, the payment application 106 may be configured to provide enlarged readable text instructions and/or audible messages to the disabled individual to thereby facilitate easy and precise execution of a payment transaction. For example, the payment application 106 may convert all transactional information regarding the payment transaction via processor 302 into enlarged readable text form and/or audible form for the cardholder's review. Additionally or alternatively, when the visually-impaired functionality is enabled, the payment application 106 may also provide instructions to the POS device for the POS device to also provide and display all transactional information regarding the payment transaction in enlarged readable text form and/or audible form for the cardholder's review. Furthermore, when the disability functionality is enabled, the payment application 106 may also provide a "talk-to-text" function, which converts some or all of the cardholder's verbal instructions or requests into a text format, which may be submitted to the POS device.

As used herein, "enlarged" text refers to text that is larger than the standard text size provided by the payment application 106. In one or more embodiments, the enlarged text may be at least 110, 120, 130, 140, 150, 160, 170, 180, 190, or 200 percent larger (based on font size) than the standard text size provided by the payment application 106. The readable text can include, for example, receipts and other information associated with the payment transaction. This readable text may be stored locally on the cardholder computer system 102 and/or the cardholder mobile computing device 104, for example, in the memory device 304 (shown in FIG. 3). Alternatively, the readable text instructions may be stored in the database 118 (shown in FIG. 1) and transmitted to payment application 106 in real-time as required. The enlarged readable text and/or audible messages may be provided in real-time from the media output 308.

When activating the disability functionality in the payment application 106, the disability functionality of the payment application 106 may allow the cardholder 202 to select amongst a designated listing of disabilities (e.g., hearing-impaired, visually-impaired, etc.) so that the payment application 106 may institute specific actions based on the selected disability. For example, if the cardholder 202 selects "visually-impaired," then the payment application 106 may provide all communications between the payment application 106 and the merchant 204 in the form of enlarged text messages and/or as auditory messages provided from the media output 308 of the cardholder's device, along with providing geolocation data to the merchant. Furthermore, the cardholder may select what specific actions that the payment application 106 can carry out based on the cardholder's selected disability, such as whether to track the geolocation of the cardholder, provide chatbot functionality, provide all communications in enlarged text form, and/or provide all communications in auditory form. For instance, the cardholder may instruct the payment application to provide all communications between the payment application 106 and the merchant 204 in the form of enlarged text messages, but not in the form of auditory messages. The above selections may be changed in real-time by selecting (e.g., pressing, swiping, voice-activated, etc.) the corresponding setting associated with these specific disability functions on the payment application 106. Thus, in such embodiments, the cardholder could "swipe" and activate the setting selecting enlarged text messages, but not swipe the icon associated with "chatbot" functionality.

At operation 508, the payment application 106 may automatically determine, via the processor 302 and the geolocation of the mobile electronic device as determined by the location determining element 314, that the mobile electronic device has entered a designated merchant space of a merchant 204 as defined by a set geofencing determined by the merchant system 120. In such embodiments, the user system 300, via the processor 302 and the location determining element 314, may detect and determine the geofencing of the designated merchant space of a merchant 204 based on signals sent out by merchant system 120. Such designated merchant space may include merchant storefronts, restaurants, gas stations, parks, food trucks, and any other location offering products and/or activities. In certain embodiments, the payment application 106 may generate an alert for display on the media output 310 to alert the cardholder 202 that he/she have entered the geofencing of a merchant 204. The degree of proximity required, and the triggering of an alert, may be determined at least in part using a trigger algorithm of the payment application 106. The trigger algorithm may automatically calculate a geofence for use in determining sufficient proximity to trigger an alert. The radius of the geofence of the designated merchant space may be determined according to a pre-configured setting of the merchant system 120.

At operation 510, the payment application 106 may automatically form a communication link with a merchant computing device, such as a POS device or self-help kiosk, within the designated geofencing of the merchant via the processor 302 over the network 108. Once linked with the merchant computing device over the network 108, the payment application 106 may manage the cardholder's interactions with the merchant computing device. When linked with the merchant computing device, the payment application 106 may allow the disabled cardholder to request specific assistance from the merchant 204 based on their disabilities and/or submit a specific shopping list of desired products (e.g., an itemized request list) to the merchant computing device.

At operation 512, if the linked merchant computing device is a POS device, the payment application 106 may optionally transmit a payment credential to the merchant computing device via the payment application server 116 to thereby initiate the commercial transaction. When the disability functionality of the payment application 106 is enabled, the payment application 106 may provide instructions to the cardholder 202 instructing the cardholder on a first step for performing a payment transaction using the payment application 106 (i.e., the digital wallet). For example, and without limitation, the audible and/or enlarged text instructions may step the cardholder 202 through an account generation process, instructing the cardholder 202 to input cardholder information such as name, address, login credentials, payment account information, etc. For performing a transaction, the audible and/or enlarged text instructions may instruct the cardholder 202 to select a payment account, for example, if two or more payments accounts are associated with the digital wallet or step the cardholder through the process of completing the transaction at the merchant point-of-sale ("POS") device (not shown). The cardholder 202 may use the payment application 106 to transmit a payment credential (e.g., the digital wallet data 306) to the merchant POS device to perform a payment transaction.

The instruction from the payment application 106 may instruct the cardholder to place the cardholder mobile computing device 104 near the POS device. When the POS device and the cardholder mobile computing device 104 make a connection, the audible and/or enlarged text instructions may indicate such to the cardholder 202. If there is an error or if a connection to the POS device is not sensed in a predetermined period, the payment application 106 may transmit an instruction to re-tap or otherwise reconnect the cardholder mobile computing device 104 to the POS device. After receiving the payment credential, the POS device initiates the payment transaction. After receiving a payment authorization response message, the POS device displays a successful purchase message to the cardholder 202 and audible and/or enlarged text instructions may indicate that the transaction was successful. If the transaction cannot be completed, the audible and/or enlarged text instructions may notify the user of the incomplete transaction and provide one or more reasons, which may typically be provided by the interchange network to the POS device. It is noted that the above-described instructions are merely examples and that many different instructions may be pre-recorded and stored for playback through the payment application 106.

At operation 514, at least one disability-friendly communication may be transmitted between the payment application 106 and the merchant POS device. These disability-friendly communications may be automatically transmitted over the network 108 via the processor 302. The disability-friendly communications may include any of the disability-friendly communications provided by the disability functionality of the payment application 106. For example, the disability-friendly communication may include transactional information that has been converted into enlarged readable text messages for the cardholder 202, a chat session facilitated by a chatbot functionality of the payment application 106, and/or transmitting an audible instruction to the payment application 106. These disability-friendly communications may adequately describe the ongoing commercial transaction, thereby allowing a disabled cardholder to carry out and finish a payment transaction at any accommodating venue. Furthermore, these disability-friendly communications may contain instructions or requests from the cardholder 202, requesting specific services or assistance from the merchant 204, including those described above. For instance, the disability-friendly communications may comprise submissions of an itemized shopping list from the cardholder 202 and/or specific requests from the cardholder 202 to the merchant 204 for assistance while within the geofencing of the merchant 204.

In certain embodiments, the disability-friendly communication may involve the chatbot functionality of the payment application 106. Thus, when a cardholder enters a designated merchant space and a determined geofencing of a merchant, the payment application 106 may automatically link with one or more POS devices in the geofencing area. Consequently, this may allow the cardholder to carry out chatbot-facilitated chat sessions with the POS devices within the designated merchant space.

In various embodiments, the cardholder 202 may optionally trigger the disability functionality setting of the payment application 106 to pause any of the above-referenced functions of the disability functionality of the payment application 106 and, optionally, the operation of the payment application 106 itself. For example, and without limitation, the cardholder 202 may determine that the audible and/or enlarged text instructions are unnecessary and choose to disable the instructions during a transaction. For example, triggering the disability icon of the payment application 106 may present to the user a notification that the instructions will be disabled until reenabled by the cardholder while continuing the payment transaction.

In another embodiment, the cardholder 202 may wish to pause the entire transaction for an indeterminate period. For example, and without limitation, the cardholder 202 may be interrupted by a sales clerk of the merchant or may become otherwise distracted while using the payment application 106. The visually-impaired setting of the payment application 106 may be triggered (e.g., by swiping and/or verbal instructions) to interrupt the process flow of the payment application 106, pausing the process until the cardholder 202 can subsequently focus his or her attention on the payment application. After triggering the visually-impaired setting of the payment application 106 (e.g., by swiping and/or verbal instructions), the payment application 106 may present to the user an audible and/or enlarged text notification that the audible instructions will be disabled until reenabled by the cardholder and subsequently present an audible option to pause the transaction process. As such, the disability setting of the payment application 106 may perform different actions at different points of use of the payment application 106. When the payment application 106 is started, the disability setting of the payment application 106 may enable or disable the audible and/or enlarged text instructions function and, during a transaction or account setup process, the disability setting of the payment application 106 may be used to pause the process for an indeterminate period.

The payment application 106 may disconnect from the wireless connections 112 and/or 114 after completion of a transaction. For example, and without limitation, in one embodiment, the payment application 106 may automatically disconnect from the wireless connections 112 and/or 114 at the termination of a payment transaction. After a predetermined period following the termination request, the payment application 106 may automatically disconnect from the wireless connections 112 and/or 114.

ADDITIONAL CONSIDERATIONS

Any actions, functions, operations, and the like recited herein may be performed in the order shown in the figures and/or described above or, unless stated otherwise or as may be approved to those ordinary skilled in the art, may be performed in a different order. Furthermore, according to certain aspects of the present invention, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, Wi-Fi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed, and substitutions made herein without departing from the scope of the invention as recited in the claims.

Having thus described one or more embodiments of the invention, what is claimed as new and desired to be protected by Letters Patent includes the following:

1. A computer-implemented method performed on a cardholder mobile smartphone associated with a cardholder, said computer-implemented method comprising the steps of:
    starting a digital wallet application on the cardholder mobile smartphone, wherein the digital wallet application comprises a disability functionality and an input icon for activating the disability functionality, the input icon presented for display on a user interface of the cardholder mobile smartphone, the cardholder mobile smartphone including a location determining element configured to receive a plurality of location signals from one or more satellites and determine a geolocation of the cardholder mobile smartphone based on the plurality of location signals;
    receiving input from the input icon upon the input icon being triggered;
    in response to receiving the input, activating the disability functionality on the digital wallet application;
    upon activating the disability functionality, automatically determining, via one or more processors and based on the geolocation of the cardholder mobile smartphone, that the cardholder mobile smartphone has entered a designated merchant space;

based on the determination of entering the designated merchant space, automatically linking the digital wallet application with a merchant computing device located within the designated merchant space via a wireless communication protocol;

transmitting a location identification marker to the merchant computing device via the location determining element;

transmitting digital wallet data from the digital wallet application to the merchant computing device; and transmitting one or more disability-based communications to the merchant computing device.

2. The computer-implemented method of claim 1, wherein the step of automatically determining comprises determining that the geolocation of the cardholder mobile smartphone is within a geofence associated with the designated merchant space.

3. The computer-implemented method of claim 1, wherein the disability functionality causes the cardholder mobile smartphone to specifically manage one or more designated disabilities of the cardholder.

4. The computer-implemented method of claim 1, wherein the step of activating the disability functionality comprises receiving input indicating one or more designated disabilities selected from a listing of disabilities associated with the disability functionality.

5. The computer-implemented method of claim 4, wherein the disability-based communications comprise a request for assistance related to the designated disabilities of the cardholder.

6. The computer-implemented method of claim 5, wherein the disability-based communications comprise an itemized request list from the cardholder.

7. The computer-implemented method of claim 1, further comprising receiving additional disability-based communications from the merchant computing device.

8. A disability-assisted transaction system comprising:
a cardholder mobile smartphone associated with a cardholder, comprising:
 a display device;
 a location determining element configured to receive a plurality of location signals from one or more satellites and determine a geolocation of the cardholder mobile smartphone based on the plurality of location signals;
 a memory device for storing data; and
 a processor communicatively coupled to the display device, the location determining element, and the memory device, wherein the processor is programmed to:
  start a digital wallet application, wherein the digital wallet application comprises a disability functionality and an input icon for activating the disability functionality, the input icon presented for display on a user interface presented on the display device;
  receive input from the input icon upon the input icon being triggered;
  in response to receiving the input, activate the disability functionality on the digital wallet application;
  upon activation of the disability functionality, automatically determine, based on the geolocation, that the cardholder mobile smartphone has entered a designated merchant space;
  based on the determination of entrance to the designated merchant space, automatically link the digital wallet application with a merchant computing device located within the designated merchant space via a wireless communication protocol;
  transmit a location identification marker to the merchant computing device via the location determining element;
  transmit digital wallet data from the digital wallet application to the merchant computing device; and
  transmit one or more disability-based communications to the merchant computing device.

9. The disability-assisted transaction system of claim 8, wherein the processor is further programmed to determine that the geolocation of the cardholder mobile smartphone is within a geofence associated with the designated merchant space.

10. The disability-assisted transaction system of claim 8, wherein the disability functionality causes the cardholder mobile smartphone to specifically manage one or more designated disabilities of the cardholder.

11. The disability-assisted transaction system of claim 8, wherein the processor is further programmed to activate the disability functionality on the digital wallet application upon receiving input indicating one or more designated disabilities selected from a listing of disabilities associated with the disability functionality.

12. The disability-assisted transaction system of claim 11, wherein the disability-based communications comprise a request for assistance related to the designated disabilities of the cardholder.

13. The disability-assisted transaction system of claim 12, wherein the disability-based communications comprise an itemized request list from the cardholder.

14. The disability-assisted transaction system of claim 13, wherein the processor is programmed to receive additional disability-based communications from the merchant computing device.

15. A non-transitory computer-readable storage media having computer-executable instructions, when executed by at least one processor, the computer-executable instructions cause the processor to:
start a digital wallet application on a cardholder mobile smartphone of a cardholder, wherein the digital wallet application comprises a disability functionality and an input icon for activating the disability functionality, the input icon presented for display on a user interface of the cardholder mobile smartphone, the mobile device including a location determining element configured to receive a plurality of location signals from one or more satellites and determine a geolocation of the cardholder mobile smartphone based on the plurality of location signals;
receive input from the input icon upon the input icon being triggered;
in response to receiving the input, activate the disability functionality on the digital wallet application;
upon activating the disability functionality, automatically determine, based on the geolocation, that the cardholder mobile smartphone has entered a designated merchant space;
based on the determination of entering the designated merchant space, automatically link the digital wallet application with a merchant computing device located within the designated merchant space via a wireless communication protocol;

transmit a location identification marker to the merchant computing device via the location determining element;

transmit digital wallet data from the digital wallet application to the merchant computing device; and transmit one or more disability-based communications to the merchant computing device.

16. The non-transitory computer-readable storage media of claim 15, wherein the computer-executable instructions further cause the processor to determine that the geolocation is within a geofence associated with the designated merchant space.

17. The non-transitory computer-readable storage media of claim 15, wherein the disability functionality causes the cardholder mobile smartphone to specifically manage one or more designated disabilities of the cardholder.

18. The non-transitory computer-readable storage media of claim 15, wherein the computer-executable instructions further cause the processor to activate the disability functionality on the digital wallet application upon receiving input indicating one or more designated disabilities selected from a listing of disabilities associated with the disability functionality.

19. The non-transitory computer-readable storage media of claim 15, wherein the disability-based communications comprise a request for assistance related to the designated disabilities of the cardholder.

20. The non-transitory computer-readable storage media of claim 15, wherein the disability-based communications comprise an itemized request list from the cardholder.

* * * * *